(12) United States Patent
Mahon (10) Patent No.: US 8,266,208 B2
(45) Date of Patent: Sep. 11, 2012

(54) METHOD AND SYSTEM FOR SHARING DOCUMENTS AMONG MEMBERS OF AN ONLINE COMMUNITY

(76) Inventor: Joseph Mahon, Boerne, TX (US)

(*) Notice: Subject to any disclaimer, the term of this patent is extended or adjusted under 35 U.S.C. 154(b) by 110 days.

(21) Appl. No.: 12/265,946

(22) Filed: Nov. 6, 2008

(65) Prior Publication Data

US 2010/0115029 A1    May 6, 2010

(51) Int. Cl.
    *G06F 15/16*    (2006.01)
(52) U.S. Cl. .... 709/204; 709/217; 235/454; 235/462.01
(58) Field of Classification Search .............. 709/204, 709/214–215, 217–219; 235/462.01, 462.24, 235/462.41, 462.46
    See application file for complete search history.

(56) References Cited

U.S. PATENT DOCUMENTS

| | | | |
|---|---|---|---|
| 6,314,425 B1 * | 11/2001 | Serbinis et al. ................... 1/1 |
| 6,993,573 B2 * | 1/2006 | Hunter ........................ 709/218 |
| 7,028,906 B2 * | 4/2006 | Challa et al. .............. 235/462.46 |
| 7,337,207 B2 * | 2/2008 | O'Brien et al. ............... 709/200 |
| 2005/0011957 A1 * | 1/2005 | Attia et al. ............... 235/462.46 |
| 2005/0198157 A1 | 9/2005 | Young |
| 2008/0033969 A1 | 2/2008 | Koo |

OTHER PUBLICATIONS

International Search Report and Written Opinion for PCT Patent Application No. PCT/US2009/060742, filed Oct. 15, 2009.
www.marketingvox.com/samsung-camera-phones-pre-loaded-with-barcode-reading-software-041162/ (viewed Nov. 6, 2008).
www.scanlife.com/faq-4.html (viewed Nov. 6, 2008).
www.scanlife.com/faq.html (viewed Nov. 6, 2008).

* cited by examiner

*Primary Examiner* — Mohamed Ibrahim
(74) *Attorney, Agent, or Firm* — Mark E. Scott; Conley Rose, P.C.

(57) ABSTRACT

Sharing documents among members of an online community. At least some of the illustrative embodiments are methods comprising, associating an electronic document with a machine-readable symbol, the machine-readable symbol comprising data regarding the electronic document, uploading the electronic document to an online community, the uploading by a first member of the online community; and performing, by a second member of the online community, an operation regarding the electronic document.

22 Claims, 4 Drawing Sheets

METHOD AND SYSTEM FOR SHARING DOCUMENTS AMONG MEMBERS OF AN ONLINE COMMUNITY

BACKGROUND

The Internet enables individuals to perform many tasks, such as publishing ideas and information, to an extremely large audience. The Internet also provides a medium to socially network by way of an online community. In particular, online communities enable a group of like-minded individuals to interact socially and/or professionally. Through an online community an individual is able to stay informed about friends within the online community or exchange professional advice with other members of the online community.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different groups may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." The term "couple" or "couples" is intended to mean either an indirect or direct connection. Thus, if a first device couples to a second device, that connection may be through a direct connection or through an indirect connection via other devices and connections.

"Online community" shall mean a web-based service that allows a group of individuals to interact with each other. Each individual registers with the "online community" to become a member and to create a member profile. The members of the "online community" share information either with all of the members or a select sub-set of the members.

"Machine-readable symbol" shall mean a symbol that is read by capturing an image of the symbol. Written languages, such as English or Chinese, shall not be considered to be a machine-readable symbol for purposes of this specification and claims.

DETAILED DESCRIPTION

The following discussion is directed to various embodiments. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
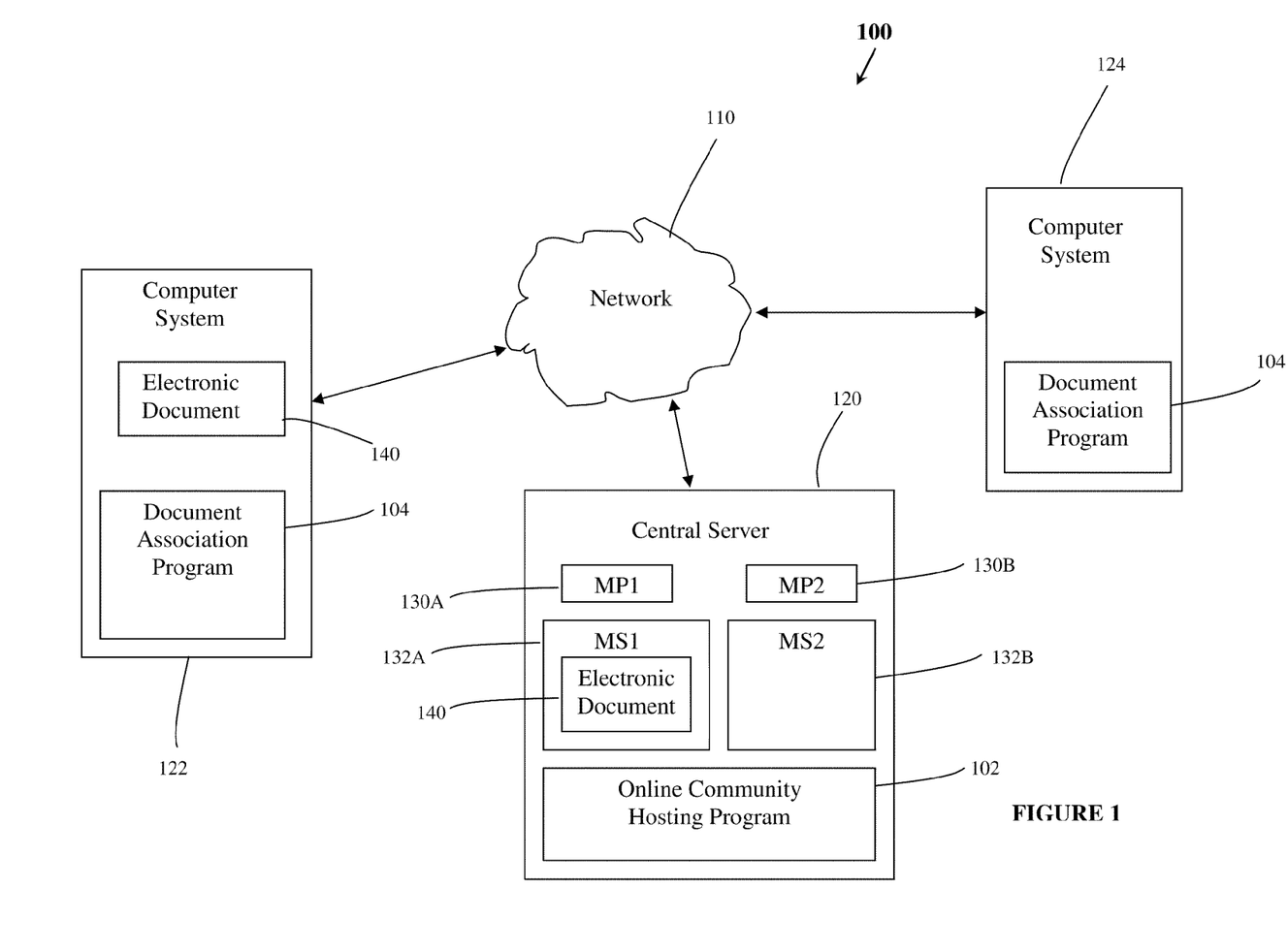
FIG. 1 illustrates a system in accordance with some of the embodiments.

FIG. 1 illustrates a system 100 in accordance with at least some embodiments. In particular, the system 100 comprises a central server 120 and computer systems 122-124. The computer systems 122-124 are communicatively coupled to the central server 120 by way of a network 110 (e.g., by way of the Internet, with the connection to the Internet through wired or wireless connections). The central server 120 executes an online community hosting program 102 to host an online community. In at least some embodiments, the online community hosting program 102 may be accessed by way of a web-based portal that provides access to one or more web pages of the online community. FIG. 1 illustrates one central server 120 executing one online community hosting program 102; however, any number of central severs may execute any number of programs to facilitate the online community.

In at least some embodiments, an individual wishing to become a member of the online community hosted by the central server 120 accesses a web-based portal by way of computer systems 122-124, such as by executing a web browser program. For example, the individual accesses a web-based portal by way of a web browser executed by computer system 122, and the individual registers with the online community to become a member. As part of the registration with the online community, the individual creates an unique member identification and a password. Additionally, the individual creates a member profile (MP) 130A comprising information such as the individual's demographic information (e.g., age, marital status, number of children, etc.) and personal interests information (e.g., travel, photography, and hobbies). The central server 120 accepts the registration of the individual with the online community, and the central server 120 associates the individual's unique member identification with the member profile 130A created by the individual.

Also in accordance with the various embodiments, the central server 120 allocates member storage (MS) area 132A, and associates the member storage area 132A with the member profile 130A. While illustrative FIG. 1 shows the member storage area 132A on the same server as the member profile 130A, the online community may be hosted by a plurality of computer systems acting as servers, and thus the member profiles 130 need not be on the same servers as the member storage areas 132. Similarly, other individuals register with the online community to become members of the online community. The central server 120 also stores the member profiles (e.g., member profile 130B) associated with the other individuals, and associates member storage areas (e.g., member storage area 132B) with their member profiles. In alternative embodiments, the central server 120 may store the member profiles on a profile database, and the central server 120 may allocate the member storage areas on a member storage database.

Before delving into the specifics of how documents are uploaded to the online community in accordance with the various embodiments, the specification first provides a high level overview. In particular, once an individual registers with the online community, the member of the online community downloads from the online community (or a location designated by the online community) a document association program. The document association program, when executed, associates a machine-readable symbol to a document that the member wishes to upload to the online community. For example, if a member of the online community wishes to upload a book report to online community, then the member executes the document association program to associate a machine-readable symbol to the book report. The machine-readable symbol uniquely identifies the book report at least within the online community, and may also identify the member who created and/or uploaded the document. Next, the member uploads the book report with the machine-readable symbol to the member's storage area 132. In some embodiments, the document association program not only associates the machine-readable symbol, but also communicatively couples to the online community and uploads the document with little or no further user input.

Referring again to FIG. 1, the specification now discusses in greater detail association of a machine-readable symbol with documents a member desires to upload to the online community. Subsequent to registering with the online community, a member downloads a document association program 104, either from the central server 120 or from a location designated by the online community. The document association program 104 may be a stand-alone executable program that the member invokes, such as by double-clicking an appropriate icon. In other embodiments, the document association program 104 may be associated with other actions, such as printing. For example, the document association program 104 may be a printer driver that the member selects from a printer list during print operations (such as printing from within a Word® program). Regardless of the precise form instantiating the document association program 104, the document association program 104 is configured to associate a machine-readable symbol with a document.

Consider, for the purpose explanation, that a member wishes to upload an electronic document 140 (e.g., a text document, a graphical document or a photograph) stored on computer system 122 to the online community hosted by the central server 120. Prior to uploading, the document association program 104 associates a machine-readable symbol with the illustrative electronic document 140. The machine-readable symbol may be placed at any suitable location of the electronic document 140. For example, the machine-readable symbol may be placed at the top-right corner of the electronic document 140, at the center of the electronic document 140, or at the bottom-left corner of the electronic document 140. In some embodiments, the machine-readable symbol is a two-dimensional barcode, but other machine-readable symbols (e.g., one-dimensional bar codes) may be equivalently used. In other embodiments, the member uploading may be able to customize, by using the document association program 104 or a suitable graphics editing program, the machine-readable symbol to be of various shape, size or color.

In at least some embodiments, the machine-readable symbol comprises a document identification that uniquely identifies the document at least within the online community, and the machine-readable symbol may also comprise other information, such as identification of the member that uploads the electronic document 140. In some embodiments, the document identification is generated locally (i.e., within the computer system 122-124 within which the document association program is executed), such as generating the identification using the Universally Unique Identifier standard of the Open Software Foundation. In other embodiments, the document association program 104 may communicate with the central server 120 of the online community to receive an assigned document identification.

Continuing with the previous example, the central server 120 receives the electronic document 140 from the computer system 122 by way of the network 110. Receiving of the electronic document 140 with the associated machine-readable symbol may take place autonomously, such as by virtue of operation of the document association program 140, or the uploading member may take positive steps to upload the electronic document 140 after the document association program 140 performs the association. The central server 120 identifies the member that uploaded, and stores the electronic document 140 in the member storage area associated with the member profile. In the particular example, the central server 120 identifies the member as the member associated with member profile 130A, and stores the electronic document 140 in the member storage area 132A as shown in FIG. 1.

In some embodiments the uploading member sets the electronic document 140 as a public electronic document (i.e., the electronic document is available to all of the members of the online community) or a private electronic document (i.e., the electronic document is available to select members of the online community). If the electronic document 140 designated as a public electronic document by the uploading member, the central server 120 makes the electronic document 140 available to all of the members of the online community. For example, a member associated with member profile 130B may access the electronic document 140 by way of the computer system 124, and the member associated with member profile 130B may perform an operation regarding the electronic document 140.

The operations performed regarding the electronic document 140 on the central server 120 by other members may take many forms. For example, the operations may comprise viewing the electronic document 140, printing the electronic document 140 and editing the electronic document 140. In some embodiments, the member associated with member profile 130B is able to perform any operation regarding the electronic document 140. In other embodiments, the member associated with member profile 130B is able to perform only the operations regarding the electronic document 140 that the uploading member enables. For example, the member associated with member profile 130B may be able to view the electronic document 140, but the member may not be able to edit the electronic document 140.

If the electronic document 140 on the central server 120 is set as a private electronic document, the central server 120 makes the electronic document 140 available to only select members of the online community. The select members may be 'friends' of the uploading member associated with member profile 130A or may be members of the online community selected by the uploading member associated with member profile 130A. In some of the embodiments, the selected members are able to perform any operation regarding the electronic document 140. For example, the selected members may edit the electronic document 140, and store the edited electronic document in the member storage area 132A. In other embodiments, the selected members are able to perform only selected of the operations regarding the electronic document 140.

The various embodiments discussed to this point are in relation to associating a machine-readable symbol with a document, uploading the document to the online community, and various aspects of operations that may be performed on an uploaded document by other members of the online community. The specification now turns to the benefits of the machine-readable symbol in relation to obtaining information related to a document of the online community when the documents are encountered in the real world by members of the online community. In accordance with the various embodiments, each machine-readable symbol associated with a document not only comprises a document identification, but also an identifier that the machine-readable symbol is associated with the online community. When a member of the community encounters a document outside the online community bearing the machine-readable symbol associated with the online community, the member of the online community is able to receive information related to the document encountered by scanning the machine-readable symbol. The member of the online community scans the machine-readable symbol associated with the document by using a mobile device. Scanning of the symbol is not limited to just scanning from paper documents; rather, the locations from which the machine-readable symbol may be scanned are many (e.g., bill boards, paper documents, web pages, product packaging).

Regardless of the location from where scanned, the mobile device extracts data from the machine-readable symbol to identify the document within the online community. Once the document has been properly identified, the mobile device initiates delivery of information related to the document to the scanning member associated with the mobile device by communicating with the online community.

Figure 2:
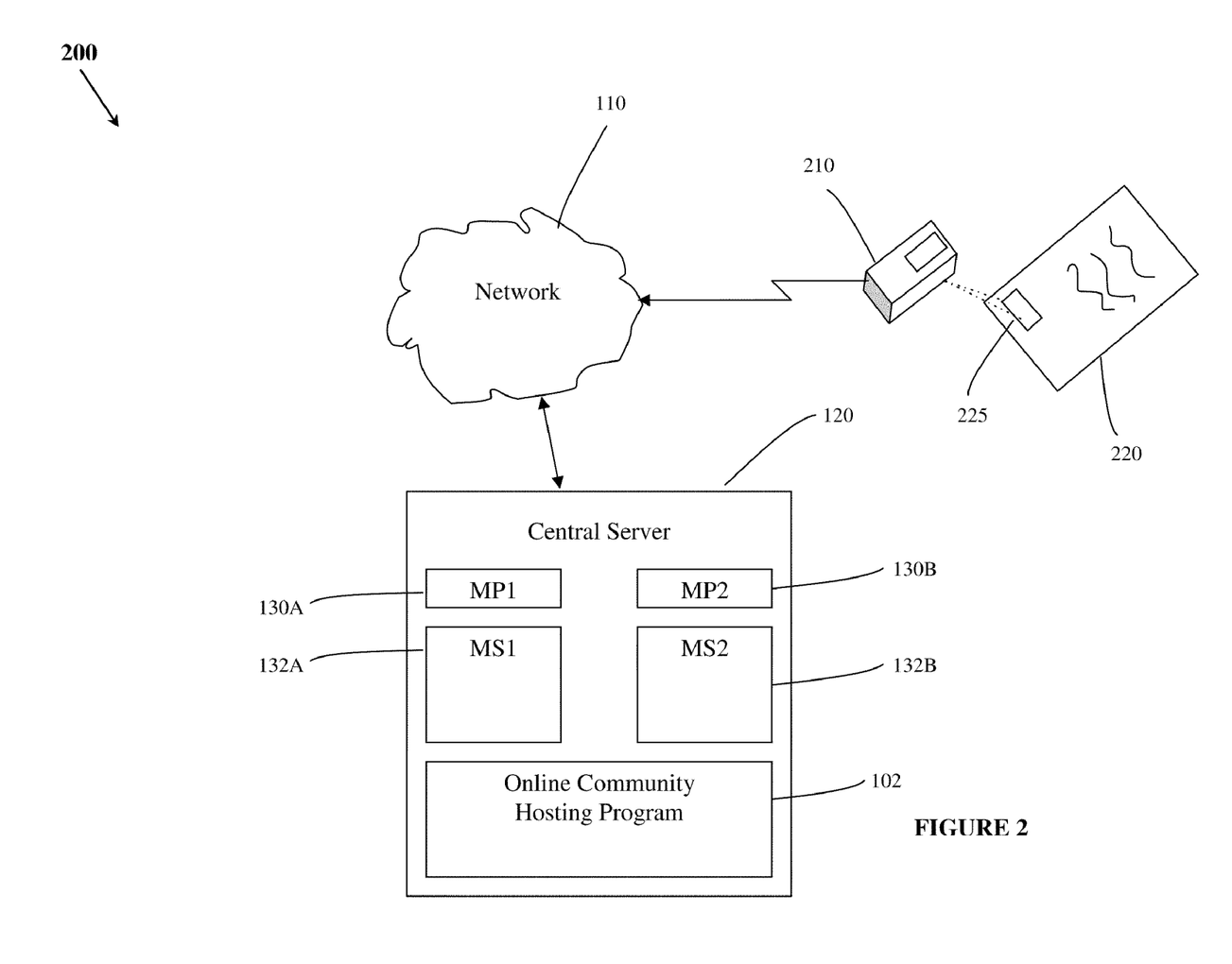
FIG. 2 illustrates a system in accordance with some of the embodiments.

FIG. 2 illustrates a system 200 in accordance with at least some embodiments related to delivery of information regarding documents of the online community. In particular, system 200 comprises the central server 120, and also a mobile device 210 in the possession of a member of the online community. The mobile device 210 may take various forms, such as a mobile phone, a personal digital assistant (PDA), a handheld wireless mobile device, a digital camera or a media player. The mobile device 210 is either continuously or intermittently communicatively coupled to the network 110 (e.g., Internet), for example by way of wireless communication system (e.g., WIFI, BLUETOOTH®, infrared, broadband connection over a cellular network).

The program executed by the mobile device 210 to perform the scanning and extraction of information from the machine-readable symbol may be preloaded on the mobile device 210 by the device manufacturer. In cases where the program is preloaded, the member may perform an action to associate the member profile with the mobile device 210, such as a one time setup where information related to the member's profile is provided to the mobile device 210. In other embodiments, the program to perform scanning and extraction of information from the machine-readable symbol may be downloaded to the mobile device 210 from the central server 120 or from a location designated by the online community. In the alternative embodiments where the program is downloaded to the mobile device 210 by the member, the program downloaded may be pre-configured to be associated with the member's profile, or the member may perform a one time setup where information related to the member's profile is provided to the mobile device 210.

In some embodiments, the mobile device 210 comprises a processor (e.g., digital signal processor), a memory (e.g., Read Only Memory (ROM) and Random Access Memory (RAM)), and charge coupled device (CCD) array configured to capture visual images. The RAM and/or ROM stores the program to perform scanning and extraction of information from the machine-readable symbol, and the processor executes the program when directed by the member. Thus, in accordance with the various embodiments the processor of the mobile device 210 executes the program that enables the mobile device 210 to scan a machine-readable symbol 225 associated with a document 220. In some embodiments, scanning may comprise capturing an image of the machine-readable symbol by way of the CCD array. In other embodiments, scanning may comprise reading the machine-readable symbol with an optical reader (e.g., a laser or LED system configured to read one-dimensional bar codes). The mobile device 210 extracts data regarding the document 220 from the machine-readable symbol, and the mobile device 210 initiates delivery of information related to the document 220 to the member through the online community (discussed more thoroughly below).

In response to a member encountering a document of the online community in the real world and scanning the machine-readable symbol associated with the document, the program executed on the mobile device 210 to scan the machine-readable symbol sends to the central server 120 the member identification of the member performing the scanning (hereinafter scanning member) along with the unique document identification determined from the machine-readable symbol 225. The central server 120 identifies the document based on the unique document identification, and then performs one of several possible operations. For example, the central server may deliver information related to the document 220 to the scanning member's electronic mail in-box of the online community (e.g., the document may be attached to an electronic mail document, the electronic mail message may comprise a hot link to the document, or the electronic mail message may comprise information regarding the document). As yet another example, the central server may deliver information regarding the electronic document identified to the scanning member's storage area (e.g., an electronic copy of the document 220, a link to an electronic copy of the document 220, or a video or a link to website related to the document 220). In some of embodiments, the member storage areas 132A-132B may comprise an area to deliver the information related to the document that is different from the storage area for storing documents uploaded by the member. Further, the member storage 132A-132B may comprise a folder where the information related to the document is delivered.

Consider, for the purpose of explanation, the document 220 is a flyer for a music concert bearing machine-readable symbol 225, and the document 220 was created by the member of the online community associated with member profile 130A. The member uploads the document 220 to the member storage area 132A, and the member also prints the document 220 (i.e., to place the flyer at various physical locations in order to advertise the concert) with the machine-readable symbol 225 visible on the document 220. Another member of the online community, for example, the member associated with member profile 130B, encounters the document 220 and scans the machine-readable symbol 225 associated with the printed document 220 by way of the mobile device 210. The mobile device 210 extracts data regarding the document 220, and initiates delivery of information regarding the document 220.

The central server 120 receives the member identification of the member that scans the document 220 and the unique document identification held in the machine-readable symbol 225. The central server 120 retrieves from the member storage area 132A information related to the document 220 based on the unique document identification. The central server 120 identifies member profile 130B as the member that scanned the document 220, and the central server 120 delivers information related to the document 220 to the member associated with member profile 130B by way of the online community. The information related to the document 220 delivered to the member storage area may be any information, such as: an electronic copy of the document 220; a link to an electronic copy of the document 220; and additional information regarding the document 220 (e.g., an audio sample of the concert). For example, the central server may deliver information related to the document 220 to the member associated with member profile's 130B electronic mail in-box of the online community. As yet another example, the central server may deliver information regarding the electronic document identified to the member associated with member profile's 130B storage area 132B. Further, the member storage 132B may comprise a folder where the information related to the document is delivered.

Figure 3:
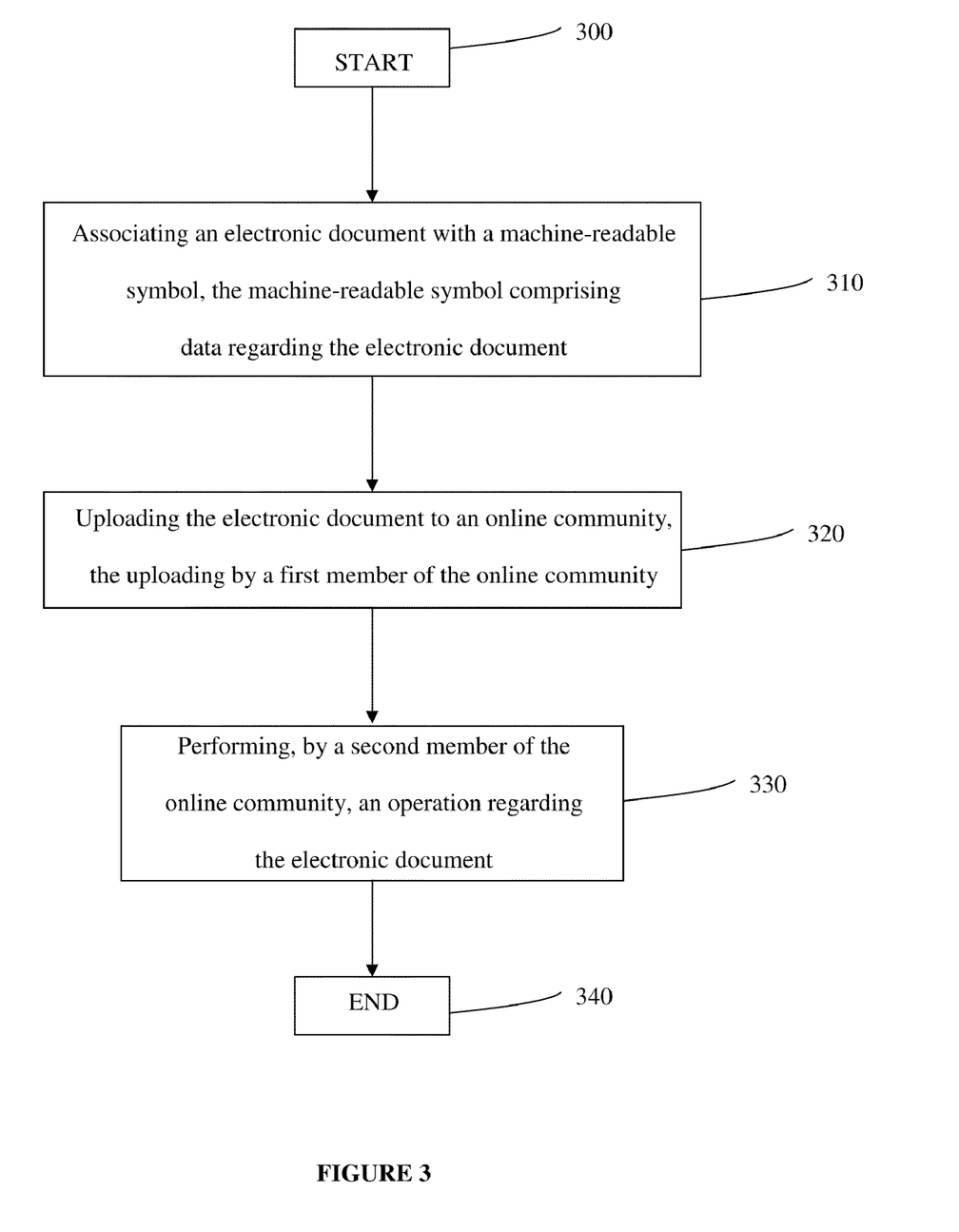
FIG. 3 illustrates a method in accordance with some of the embodiments.

FIG. 3 illustrates a method in accordance with at least some of the embodiments. The method of FIG. 3 assumes, prior to associating, registration of, and creation of a member profile, for a first member of the online community and registration of, and creation of a member profile, for a second member of the online community. In particular, the method starts (block 300), and moves to associating a machine-readable symbol (e.g., a two-dimensional barcode) with an electronic document (block 310). The machine-readable symbol comprises data regarding the electronic document. Thereafter, the electronic document is uploaded to the online community (block 320), with the electronic document uploaded by a first member of the online community. A second member of the online community performs an operation regarding the electronic document (block 330). The operation regarding the electronic file may comprise, for example, viewing the electronic document, printing the electronic document, and editing the electronic document. Thereafter, method ends (block 340).

Figure 4:
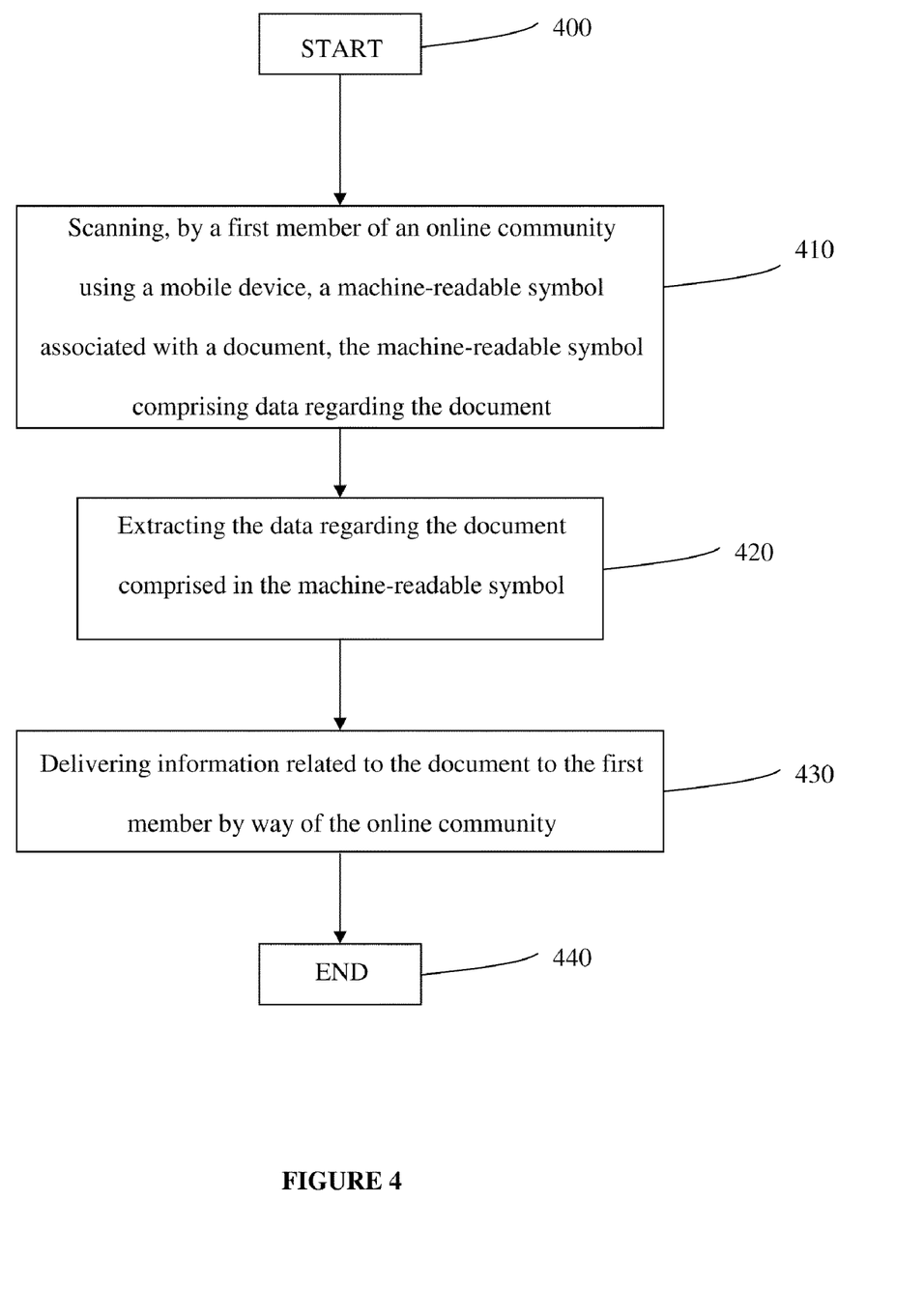
FIG. 4 illustrates a method in accordance with some of the embodiments.

FIG. 4 illustrates yet another method in accordance with at least some of embodiments. In particular, the method starts (block 400), and moves to scanning, by a first member of an online community using a mobile device, a machine-readable symbol associated with a document (block 410). In at least some embodiments, scanning the machine-readable symbol may comprise capturing an image of the machine-readable symbol, or reading the machine-readable symbol using an optical reader. The machine-readable symbol comprises data regarding the document, such as a unique document identification. Next, the data regarding the document is extracted from the machine-readable symbol (block 420). Thereafter, information related to the document is delivered to the first member by way of the online community (block 430). The information related to the document delivered to the first storage area of the first member may comprise, for example, an electronic copy of the document, a link to an electronic copy of the document, and additional information regarding the document. Thereafter, the method ends (block 440).

The central servers and computer systems described above may be any computer system suitable for implementing one or more embodiments disclosed herein. Each computer system includes a least one processor that is in communication with memory devices including secondary storage (e.g., disk drives, tape drives, or optical drives), read only memory (ROM), random access memory (RAM). The processor executes instructions, codes, programs, or scripts which it accesses from secondary storage, ROM, or RAM.

From the description provided herein, those skilled in the art are readily able to combine software created as described with appropriate general-purpose or special-purpose computer hardware to create a computer system and/or computer subcomponents in accordance with the various embodiments, to create a computer system and/or computer subcomponents for carrying out the methods of the various embodiments, and/or to create a computer-readable storage media or mediums for storing a software program to implement the method aspects of the various embodiments.

The above discussion is meant to be illustrative of the principles and various embodiments of the present invention. Numerous variations and modifications will become apparent to those skilled in the art once the above disclosure is fully appreciated. For example, the member storage area need not be fully delineated for each member of the online community; the member storage area may be one storage area without any segregation among the members of the online community. Moreover, the machine-readable symbol may be associated with other goods (e.g., consumer products, or medical prescription containers). Additionally, the machine-readable symbol may be personalized to be any shape, size, or color. It is intended that the following claims be interpreted to embrace all such variations and modifications.

What is claimed is:

1. A method comprising:
    associating an electronic document with an optically machine-readable symbol, the optically machine-readable symbol comprising data regarding the electronic document, and the optically machine-readable symbol associated with a human readable identifier indicating the optically machine-readable symbol is associated with an online community;
    uploading the electronic document to the online community, the uploading by a first member of the online community;
    sending information associated with the electronic document to a second member of the online community, the sending by way of a service provided by the online community, and the sending responsive to the second member scanning the optically machine-readable symbol on a copy of the electronic document found outside the online community; and
    sending information associated with the electronic document to a third member of the online community, the sending by way of a service provided by the online community, and the sending responsive to the third member scanning the optically machine-readable symbol on a copy of the electronic document found outside the online community.

2. The method of claim 1 further comprising, prior to associating:
    accepting registration of the first member and the second member with the online community;
    creating a first member profile associated with the first member and a second member profile associated with the second member; and
    facilitating interaction between the first member and second member apart from the electronic document.

3. The method of claim 2 wherein the performing further comprises subsequent to uploading:
    enabling the second member of the online community to edit the electronic document; and
    saving the edited electronic document to a first storage area associated with the first member profile of the first member.

4. The method of claim 1 wherein sending further comprises sending the information to an electronic mail in-box of the online community, the electronic mail inbox of the second member.

5. The method of claim 4 wherein sending further comprises sending at least one selected from the group consisting of: sending a copy of the electronic document as an attachment to the electronic mail message;
    sending the electronic mail message comprising a hot link to the document;
    sending the electronic mail message comprising information regarding the electronic document.

6. The method of claim 1:
    wherein uploading further comprises uploading to a first member storage area assigned to the first member; and
    wherein sending further comprises sending the information associated with the online document to a second member storage area assigned to the second member, the second member storage area distinct from the first member storage area.

7. The method of claim 6 wherein sending further comprises sending at least one selected from the group consisting of: sending a copy of the electronic document to the second member storage area; sending a hot link to the document to the second member storage area; sending information regarding the electronic document to the second member storage area.

8. The system of claim 1 wherein when the central server sends, the central server is further configured to send information to an electronic mail in-box of the online community, the electronic mail inbox of the second member.

9. The system of claim 8 wherein when the central server sends, the central server is further configured to send at least one selected from the group consisting of: a copy of the electronic document as an attachment to the electronic mail message; the electronic mail message comprising a hot link to the document; the electronic mail message comprising information regarding the electronic document.

10. The method of claim 1 wherein the optically machine-readable symbol is a two dimensional barcode.

11. A system comprising:
a central server configured to host an online community;
the central server configured to receive an electronic document associated with an optically machine-readable symbol, the electronic document uploaded by a first member of the online community to the central server, and the optically machine-readable symbol associated with a human-readable identifier indicating the optically machine-readable symbol is associated with the online community;
the central server further configured to send information associated with the electronic document to a second member of the online community, the sending by way of a service provided by the online community, and the sending responsive to the second member scanning the optically machine-readable symbol on a copy of the electronic document found outside the online community; and
the central server further configured to send information associated with the electronic document to a third member of the online community, the sending by way of a service provided by the online community, and the sending responsive to the third member scanning the optically machine-readable symbol on a copy of the electronic document found outside the online community.

12. The system of claim 11:
wherein when the central server receives the electronic document, the central server is further configured to receive the electronic document into a first member storage area assigned to the first member; and
wherein when the central server sends, the central server is further configured to send the information associated with the online document to a second member storage area assigned to the second member, the second member storage area distinct from the first member storage area.

13. The method of claim 12 wherein when the central server sends, the central server is further configured to send at least one selected from the group consisting of: a copy of the electronic document to the second member storage area; a hot link to the document to the second member storage area; information regarding the electronic document to the second member storage area.

14. A method comprising:
scanning, by a first member of an online community using a first mobile device, an optically machine-readable symbol associated with a document, the optically machine-readable symbol comprising data regarding the document;
extracting the data regarding the document comprised in the optically machine-readable symbol, the extracting by the first mobile device;
delivering information related to the document to the first member by at least one selected from the group consisting of: delivering the information related to the document to an electronic mail in-box of the first member; and making a copy of information related to the document from a first location of a second member at which the information is stored, and placing the copy of the information related to the document at a second location dedicated to the first member, the second location distinct from the first location;
scanning, by a third member of the online community using a second mobile device, the optically machine-readable symbol associated with the document, the optically machine-readable symbol comprising data regarding the document;
extracting the data regarding the document comprised in the optically machine-readable symbol, the extracting by the second mobile; and
delivering information related to the document to the third member by at least one selected from the group consisting of: delivering the information related to the document to an electronic mail in-box of the third member; and making a copy of information related to the document from the first location at which the information is stored, and placing the copy of the information related to the document at a third location dedicated to the third member, the third location distinct from the first location and distinct from the second location.

15. The method of claim 14 wherein the delivering further comprises delivering to the first member by way of the online community at least one selected from the group consisting of: an electronic copy of the document; a link to an electronic copy of the document; and additional information regarding the document.

16. The method of claim 14 further comprising, prior to scanning:
accepting registration of the first member with the online community;
creating a first member profile associated with member; and
associating the first storage area with the first member profile of the first member of the online community.

17. The method of claim 14 wherein the optically machine-readable symbol is a two dimensional barcode.

18. A non-transitory computer-readable medium storing a program that, when executed by a processor, causes the processor to:
associate an optically machine-readable symbol with an electronic document, the optically machine-readable symbol comprises a unique document identification associated with the electronic document;
associate a human-readable identifier with the optically machine-readable symbol, the human readable symbol indicates that optically machine-readable symbol is associated with an online community;
upload the electronic document to a storage area of a first member of the online community associated with the member identification;

send information associated with the electronic document to a second member of the online community, the sending by way of a service provided by the online community, and the sending responsive to the second member scanning the optically machine-readable symbol on a copy of the electronic document found outside the online community;

send information associated with the electronic document to a third member of the online community, the sending by way of a service provided by the online community, and the sending responsive to the third member scanning the optically machine-readable symbol on a copy of the electronic document found outside the online community.

19. The non-transitory computer-readable medium of claim 18 wherein when the processor associates the optically machine-readable symbol within the electronic document, the program causes the processor to at least one selected from the group consisting of: generate the unique document identification; obtain the unique document identification from the online community.

20. A non-transitory computer-readable medium a program that, when executed by a processor, causes the processor to:
  receive from a mobile device a unique document identification extracted from an optically machine-readable symbol associated with a document, the mobile device associated with a member of an online community;
  retrieve information related to the document based on the unique document identification; and
  deliver information associated with the electronic document to a first member of an online community, the delivering by way of a service provided by the online community, and the delivering responsive to the first member scanning with the mobile device the optically machine-readable symbol on a copy of the electronic document found outside the online community; and
  deliver information associated with the electronic document to a second member of an online community, the delivering by way of a service provided by the online community, and the delivering responsive to the second member scanning with the mobile device the optically machine-readable symbol on a copy of the electronic document found outside the online community.

21. The non-transitory computer-readable medium of claim 20 wherein when the processor delivers, the program causes the processor to deliver at least one selected from the group consisting of: an electronic copy of the document to an electronic mail in-box of the online community; an electronic copy of the document to a dedicated storage area of the first member, the dedicated storage area distinct from a dedicated storage area at which an original copy of the electronic document is stored; a link to an electronic copy of the document; and additional information regarding the document.

22. The non-transitory computer-readable medium of claim 20 wherein when the processor receives, the program causes the processor to receive a member identification that identifies the member of the online community associated with the mobile device.

* * * * *